US011163415B2

(12) United States Patent
Sun et al.

(10) Patent No.: US 11,163,415 B2
(45) Date of Patent: Nov. 2, 2021

(54) TOUCH DISPLAY MODULE, TOUCH DISPLAY DEVICE AND ELECTRONIC DEVICE

(71) Applicant: BOE TECHNOLOGY GROUP CO., LTD., Beijing (CN)

(72) Inventors: Baofeng Sun, Beijing (CN); Zewen Bo, Beijing (CN); Shangchieh Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,826

(22) Filed: Mar. 20, 2020

(65) Prior Publication Data
US 2021/0004099 A1     Jan. 7, 2021

(30) Foreign Application Priority Data
Jul. 2, 2019     (CN) .......................... 201910591356.X

(51) Int. Cl.
*G06F 3/045*     (2006.01)
*G06F 3/041*     (2006.01)

(52) U.S. Cl.
CPC ............ *G06F 3/045* (2013.01); *G06F 3/0414* (2013.01); *G06F 2203/04103* (2013.01)

(58) Field of Classification Search
CPC ................... G06F 3/045; G06F 3/0414; G06F 2203/04103; G06F 2203/04105; G06F 3/041
See application file for complete search history.

(56) References Cited

U.S. PATENT DOCUMENTS

| | | | |
|---|---|---|---|
| 6,356,259 B1 * | 3/2002 | Maeda | B32B 17/10018 156/99 |
| 10,048,792 B1 * | 8/2018 | Schediwy | G06F 3/0418 |
| 10,359,326 B2 * | 7/2019 | Toyoshima | G01L 5/0038 |
| 10,852,892 B2 * | 12/2020 | Mori | G06F 3/044 |
| 2011/0037726 A1 * | 2/2011 | Lee | G06F 3/04142 345/174 |
| 2016/0370908 A1 * | 12/2016 | Kim | G06F 3/0412 |

* cited by examiner

*Primary Examiner* — Bryan Earles
(74) *Attorney, Agent, or Firm* — Kinney & Lange, P.A.

(57) ABSTRACT

A touch display module, a touch display device, and an electronic device are provided. The touch display module includes a display panel assembly and a touch panel assembly opposite to each other, with an adhesive frame disposed between the display panel assembly and the touch panel assembly. The display panel assembly comprises a force sensing resistor layer on a side of the display panel assembly facing the touch panel assembly, and the adhesive frame is configured to adhere a peripheral region of the display panel assembly to a peripheral region of the touch panel assembly.

19 Claims, 5 Drawing Sheets

TOUCH DISPLAY MODULE, TOUCH DISPLAY DEVICE AND ELECTRONIC DEVICE

CROSS-REFERENCE TO RELATED APPLICATION

The present disclosure claims the benefit of Chinese Patent Application No. 201910591356.X filed on Jul. 2, 2019 in the National Intellectual Property Administration of China, the whole disclosure of which is incorporated herein by reference.

BACKGROUND

The present disclosure relates generally to the field of display technology, and more particularly to a touch display module, a touch display device, and an electronic device.

A touch layer is one of the most important film layers of a touch display module. Since the implementation of touch functions in smartphones, touch technology has undergone a transition from primarily using resistive type technology to now commonly using capacitive type technology. Unlike the resistive touch technologies of the past, current capacitive touch technologies are capable of recognizing very light touches and floating touches of conductors such as fingers. Capacitive touch technology also has its limitations, however, including the inability to recognize touches by non-conductors such as thin pen tips and wooden sticks.

Resistive 3D touch technology is gradually becoming more widely used. 3D touch technology can be applied to touch of non-conductive pen tips, brush drawings, etc. However, the current touch display modules equipped with 3D touch function have low sensitivity and low resistance to bending.

SUMMARY

Some embodiments of the present disclosure provide a touch display module, comprising: a display panel assembly and a touch panel assembly opposite to each other; and an adhesive frame between the display panel assembly and the touch panel assembly, wherein the display panel assembly comprises a force sensing resistor layer on a side of the display panel assembly facing the touch panel assembly, and the adhesive frame is configured to adhere a peripheral region of the display panel assembly to a peripheral region of the touch panel assembly.

In some embodiments, the display panel assembly further comprises: a back plate; a plurality of display units arranged in an array on the back plate; and a cover plate on a side of the plurality of display units away from the back plate, wherein, the force sensing resistor layer is disposed on a side of the back plate away from the cover plate, the touch panel assembly comprises a touch panel, and the force sensing resistor layer and the touch panel face each other.

In some embodiments, the adhesive frame is disposed between the force sensing resistor layer and the touch panel, and the adhesive frame is configured to adhere the force sensing resistor layer to the touch panel.

In some embodiments, the touch panel comprises a touch region and a border region surrounding the touch region, and an orthographic projection of the adhesive frame on the touch panel falls within the border region.

In some embodiments, the force sensing resistor layer comprises a protruding portion facing the touch panel, and an orthographic projection of the protruding portion on the touch panel falls within the touch region or coincides with the touch region.

In some embodiments, the touch panel comprises a touch region, an orthographic projection of the adhesive frame on the touch panel at least partially overlaps with the touch region, and the adhesive frame is a conductive adhesive frame.

In some embodiments, the force sensing resistor layer comprises a protruding portion facing the touch panel, the protruding portion is surrounded by the adhesive frame, and an orthographic projection of the protruding portion on the touch panel does not overlap with an orthographic projection of the adhesive frame on the touch panel.

In some embodiments, the adhesive frame is a closed frame.

In some embodiments, the touch panel assembly further comprises: a base layer configured to support the touch panel; and an adhesive layer disposed between the base layer and the touch panel and configured to adhere the base layer with the touch panel, wherein the base layer is located on a side of the touch panel away from the force sensing resistor layer.

In some embodiments, the adhesive frame is disposed between the cover plate and the base layer, and is configured to adhere the cover plate to the base layer, and the adhesive frame surrounds the back plate, the force sensing resistor layer, and the touch panel which are stacked on each other.

In some embodiments, the adhesive frame is not a closed frame and comprises a cable outlet.

In some embodiments, the adhesive frame is disposed between the back plate and the base layer and is configured to adhere the back plate to the base layer, and the adhesive frame surrounds the force sensing resistor layer and the touch panel which are stacked on each other.

In some embodiments, the adhesive frame is not a closed frame and comprises a cable outlet.

In some embodiments, the touch panel comprises: a substrate; a touch electrode layer disposed on one side of the substrate and facing the force sensing resistor layer; and a lead wire layer disposed on the other side of the substrate opposite to the one side, wherein the substrate is provided with a lead hole so that a lead wire in the lead wire layer is electrically connected to the touch electrode layer through the lead hole.

In some embodiments, the touch panel comprises a touch region, and the touch region covers the entire substrate.

In some embodiments, the display panel is an OLED display panel, and each display unit is an OLED element.

In some embodiments, the base layer is a flexible steel sheet layer, and the adhesive layer is a pressure-sensitive adhesive layer.

Some embodiments of the present disclosure provide a touch display device, comprising: the touch display module according to the above embodiments; a middle frame comprising a bottom portion and a side portion, wherein the side portion extends from an edge of the bottom portion in a direction perpendicular to the bottom portion, and the bottom portion and the side portion surround an accommodating space which accommodates the touch panel assembly; and an outer adhesive frame disposed between the cover plate and the side portion, and configured to adhere the cover plate to the side portion.

In some embodiments, the outer adhesive frame is not a closed frame and comprises a cable outlet.

Some embodiments of the present disclosure provide an electronic device, comprising the touch display device according to the above touch display device.

The present summary is provided only by way of example, and not limitation. Other aspects of the present disclosure will be appreciated in view of the entirety of the present disclosure, including the entire text, claims, and accompanying figures.

Figure 1:
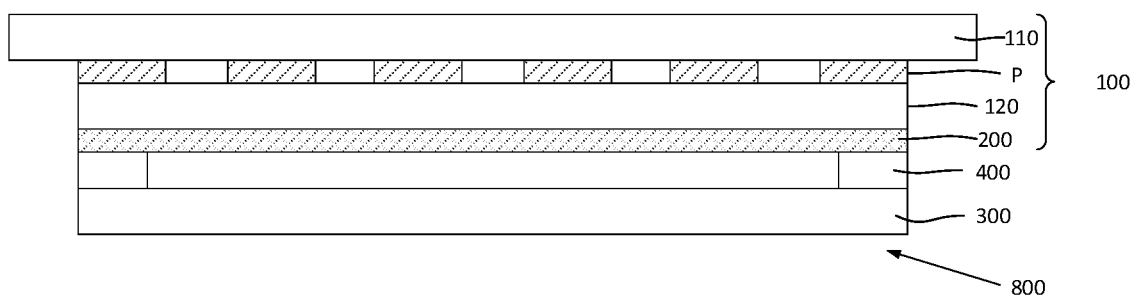
FIG. 1 is a schematic structural view of a touch display module provided by some embodiments of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION OF THE EMBODIMENTS

The present disclosure is described in detail below. Embodiments are presented below, in combination with the figures, in order to more clearly describe the technical solutions of the present disclosure. The drawings and the following description provide only exemplary embodiments of these technical solutions, and further embodiments may be obtained by those skilled in the art based on the present disclosure without any creative efforts. In order to make the objectives, technical solutions, and advantages of the present disclosure more clear, the present disclosure will be further described in detail below with reference to specific embodiments in combination with the accompanying drawings. The embodiments described below with reference to the drawings are exemplary, and are only used to explain the present disclosure, and should not be construed as limiting the present disclosure.

In the exemplary embodiments shown in the drawings, the same or similar reference numerals are used to indicate the same or similar components, or components having the same or similar function. Further, if detailed explanations of known technologies are unnecessary for the features of the present disclosure to be understood, such explanations may be omitted.

It will be understood by those skilled in the art that, unless otherwise defined, all terms (including technical terms and scientific terms) used herein have the same meaning as commonly understood by one of ordinary skill in the art to which the present disclosure belongs. It should also be understood that terms such as those defined in the general dictionary should be understood to have meanings consistent with the meanings in the context of the prior art, and unless specifically defined like this, it will not be interpreted in an idealized or overly formal sense.

Those skilled in the art will understand that, unless specifically stated otherwise, the singular forms "a", "an", "the" and "said" may include plural forms. It should be further understood that the terms "include", "comprise" used in the specification of the present disclosure refers to the presence of the described features, integers, steps, operations, elements and/or components, but does not exclude the presence or addition of one or more other features, Integers, steps, operations, elements, components, and/or combinations thereof. It should be understood that when an element is referred to as being "connected" to another element, it may be directly connected to the other element or intervening elements may also be present. In addition, "connection" as used herein may include wireless connections. As used herein, the term "and/or" includes all or any of the elements and all combinations of one or more of the associated listed items.

First, several terms involved in the present disclosure are introduced and explained as follow:

An organic light-emitting diode (OLED) display panel includes a plurality of organic light emitting diodes, and is a type of electroluminescent display panel with characteristics such as lightness, thinness, power saving and the like. OLED display technology differs from the traditional LCD display technology, in that it does not require a backlight, and has a very thin coating of organic materials on a substrate. When supplied with an electric current, the organic materials will emit light. In addition, OLED display panels can be made lighter and thinner than conventional LCD panels, with larger viewing angles, and reduced power draw. Further, OLED panels can be manufactured on substrates of different materials and made into a flexible displays that may be bent.

A force sensing resistor (FSR) is a type of bending pressure sensor, and a structural layer composed of FSR is the force sensing resistor layer, such as a conductive particle ink layer. When a force is applied to the force sensing resistor layer, the resistance of the pressed area will change with the change in pressure, which may generate an electrical signal representing the strength.

A touch panel (also referred to as touch sensor panel, or TSP) is used to determine a touch position. It is a key component in a touch display module and is used to generate an electrical signal representing the touch position.

An adhesive frame is a frame structure composed of adhesive to realize the connection of structural layers bonded to both sides of the frame structure. The adhesive frame may be a closed frame structure or an unclosed frame structure.

Touch screen technology has been senses pressure on a screen and triggers related action instructions accordingly. The resistive touch scheme in the related technology relies on FSR technology to trigger related action instructions according to the degree of pressure. In the related art, a 3D touch scheme with touch force sensing function adopts a structure in which a force sensing resistor layer and the touch panel are fully bonded, specifically, the force sensing resistor layer and the touch panel are coated with a conductive adhesive layer on the entire surface to achieve adhesive bonding. To ensure inductive sensitivity, the conductive adhesive surface layer must be limited to a very thin level (less than 10 μm). However, when the conductive adhesive layer is thin, on one hand, the coating process is difficult and the production cost is high; on the other hand, the conductive adhesive surface layer can have poor adhesion, such that the pressure-sensitive resistance layer and the touch panel are prone to peeling and cracking, and thus unsuitable for application in emerging flexible screens.

Methods of bonding the touch panel to the force sensing resistor layer with the conductive adhesive layer can cause the following problems: if the conductive adhesive layer is thin, there is a problem that the structure is not reliable, and a touch display module is prone to peeling or cracking; if the conductive adhesive surface layer is thick, there is another problem that the touch sensitivity is reduced. Therefore, the touch display module, the touch display device and the electronic device provided by the present disclosure are aimed at solving the above technical problems of the prior art.

Technical solutions to the above technical solutions are presented with the embodiments that follow.

The present disclosure provides a touch display module including: a display panel assembly and a touch panel assembly opposite to each other; and an adhesive frame located between the display panel assembly and the touch panel assembly. The display panel assembly includes a force sensing resistor layer on a side of the display panel assembly facing the touch panel assembly, and the adhesive frame is configured to adhere a peripheral region of the display panel assembly to a periphery region of the touch panel assembly. The touch display module with this structure has a better bending reliability, so that the display panel assembly and the touch panel assembly in the touch display module are not prone to peeling and cracking during a bending process.

Some embodiments of the present disclosure provide a touch display module. FIG. 1 is a schematic structural view of a touch display module provided by some embodiments of the present disclosure. As shown in FIG. 1, the touch display module includes: a display panel assembly 100 and the touch panel assembly 800 opposite to each other, and an adhesive frame 400 located between the display panel assembly 100 and the touch panel assembly 800. The display panel assembly 100 includes a force sensing resistor layer 200 located on a side of the display panel assembly 100 facing the touch panel assembly 800. The adhesive frame 400 is configured to adhere a peripheral region of the display panel assembly 100 to a peripheral region of the touch panel assembly 800.

In the following description of the present disclosure, the display panel assembly 100 is exemplified as an OLED display panel assembly including an OLED display panel. In the following description, the display panel assembly 100 is also referred to as an OLED display panel assembly 100.

Those skilled in the art may understand that the display panel assembly 100 in the present disclosure may be other display panel assemblies, such as a PLED display panel assembly or the like.

As shown in FIG. 1, the OLED display panel assembly 100 includes a back plate 120 and display units P, such as OLED elements, arranged in an array on the back plate 120. The back plate 120 and the display units P thereon constitute an OLED display panel. The OLED display panel assembly 100 further includes a cover plate 110 covering the OLED display panel. The cover plate 110 is disposed on a side of the display units P away from the back plate 120 to protect the OLED display panel. A force sensing resistor layer 200 is located on a side of the back plate 120 away from the display units P. In some embodiments, the force sensing resistor layer 200 may be directly printed on a surface of the back plate 120 on the side away from the display units P.

The touch panel assembly 800 includes a touch panel 300, and the force sensing resistor layer 200 and the touch panel 300 face each other. The adhesive frame 400 is disposed between the force sensing resistor layer 200 and the touch panel 300, and the adhesive frame 400 is configured to adhere the force sensing resistor layer 200 to the touch panel 300.

Figure 2:
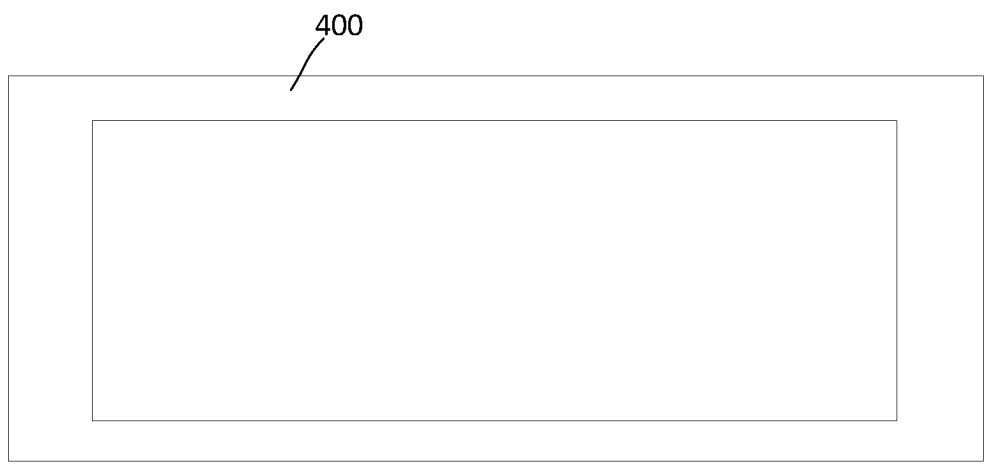
FIG. 2 is a schematic plan view of an adhesive frame provided by some embodiments of the present disclosure.
Figure 3:
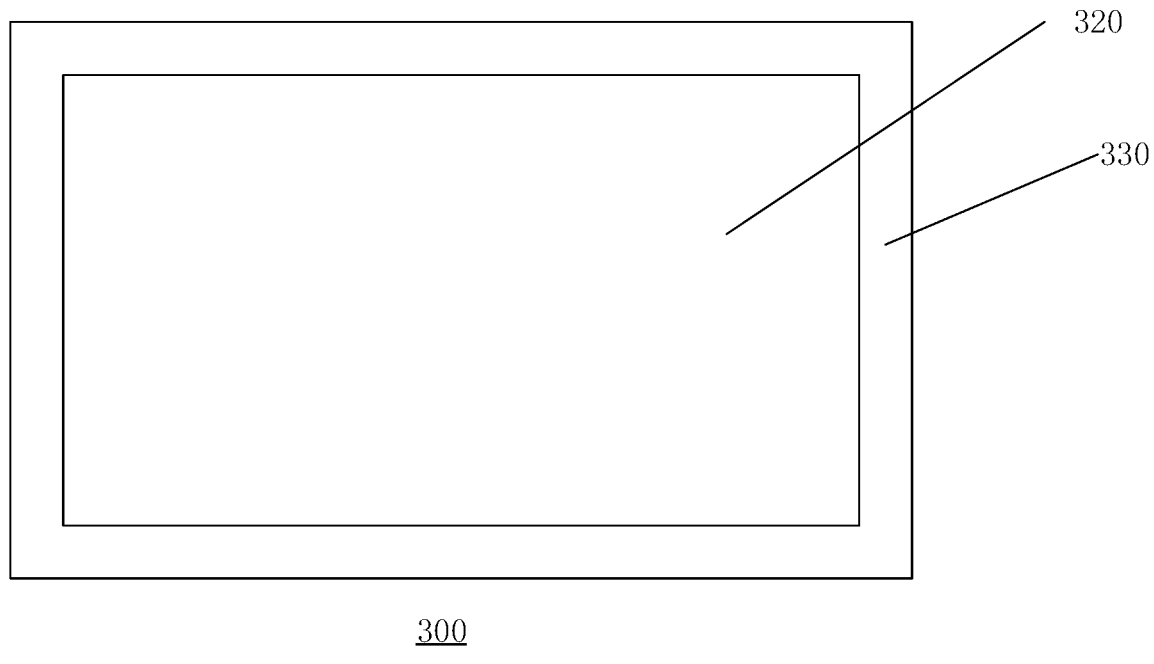
FIG. 3 is a schematic plan view of a touch panel provided by some embodiments of the present disclosure.

FIG. 2 is a schematic plan view of an adhesive frame according to some embodiments of the present disclosure. As shown in FIG. 2, the adhesive frame 400 is in a closed frame structure. FIG. 3 is a schematic plan view of a touch panel provided by some embodiments of the present disclosure. As shown in FIG. 3, the touch panel 300 includes a touch region 320 and a border region 330 surrounding the touch region 320. A touch electrode layer is provided in the touch region 320 and used for sensing a touch position, and a lead wire is provided in the border region 330 and used for leading a touch signal generated by the touch electrode layer.

As shown in FIGS. 1-3, the adhesive frame 400 adheres a peripheral region of the force sensing resistor layer 200 to a peripheral region of the touch panel 300, such as the border region 330. There is a gap of a predetermined thickness between a middle region of the force sensing resistor layer 200 and a middle region of the control panel 300, such as the touch region 320.

Specifically, under the action of the adhesive frame 400, no adhesive is required between the middle region of the force sensing resistor layer 200 and the touch region 320 of the touch panel 300, and there is no other material structure. There is a gap (as shown in FIG. 1) of a certain thickness between the middle region of the force sensing resistor layer 200 and the touch region 320 of the touch panel 300. When the gap of a certain thickness exists, as long as external pressure acts on the force sensing resistor layer 200 to deform the force sensing resistor layer 200, the force sensing resistor layer 200 may be in direct contact with the touch region 320 of the touch panel 300. The change in resistance generated by the force sensing resistor layer 200 under pressure may be detected through the touch electrode layer and the lead wire on the touch panel 300.

Since the force sensing resistor layer 200 and the touch region 320 of the touch panel 300 are in direct contact after the force sensing resistor layer 200 is pressed, the touch sensitivity is very high, which may realize pressure touch sensing with different touch levels. In addition, a thickness of the adhesive frame 400 is not limited by the force sensing resistor layer 200 and the touch panel 300. Therefore, the thickness of the adhesive frame 400 may be set according to actual needs to ensure that the display panel assembly 100 and the touch panel assembly 800 in the touch display module are firmly bonded. In addition, a setting area of the adhesive frame 400 is relatively small. Compared with the original coating process for the adhesive layer, the coating process for the adhesive frame is significantly less difficult to produce, and is also conducive to reducing production costs. More prominently, it has been found through dynamic simulation tests that the bending reliability of the touch display module formed by using the adhesive frame 400 to connect the display panel assembly 100 with the touch panel assembly 800 is much better than the touch display module formed by using the adhesive layer to connect the display panel assembly with the touch panel assembly, and is more suitable for use in foldable panels and foldable devices.

In some embodiments, as shown in FIG. 3, the touch panel 300 further includes the border region 330 that surrounds the touch region 320, and the adhesive frame 400 is disposed between the force sensing resistor layer 200 and the touch panel 300. An orthographic projection of the adhesive frame 400 on the touch panel is located in the border region 330. A common touch panel 300 often adopts this structure. At this time, the adhesive frame 400 is disposed in the border region 330. The touch panel has a relatively simple structure and may be produced by most existing production equipments. It may not only improve the bending reliability of the touch display module to make the touch display module suitable for foldable panels and devices, but also save production costs.

Specifically, the adhesive frame 400 is composed of an adhesive, and the adhesive is usually a polymer material, which may be an insulating material or a conductive material. When the adhesive frame 400 is disposed in a non-touch region that does not have a touch sensing effect, that is, in the frame area 330, the adhesive frame 400 may adopt an insulating adhesive. In this case, the production cost of the touch display module is low. Whether the adhesive frame 400 is disposed between the force sensing resistor layer 200 and the touch panel 300 as shown in FIG. 1, or the adhesive frame 400 is disposed between the force sensing resistor layer 200 having a protruding portion and the touch panel 300 as shown in FIG. 3, the adhesive frame 400 can use a relatively inexpensive insulating adhesive.

In the process step of coating the adhesive frame 400, the width of the adhesive frame 400 should be appropriate. If the width is too large, the adhesive is wasted and it takes up a lot of space. If the width is too small, the firmness of the adhering structure may not be ensured.

If the width is too large, the colloid is wasted, and it takes up a large space, and if the width is too small, the firmness of the bonding structure cannot be ensured. The width of the adhesive frame 400 is generally related to the members to be bonded, and is reasonably adjusted according to actual needs. Optionally, the width of the adhesive frame 400 is 0.1 to 0.3 mm smaller than the overall width of the coated position, such as, the border region. The adhesive frame is coated in the middle of the coated position, a side of the adhesive frame (such as the left side or the right side) is about 0.1~0.3 mm away from the side of the coated region (such as the left side or the right side), so as to adapt to the widened adhesive frame 400 after bonding. For example, the width of the border region 330 is 2 mm, the width of the adhesive frame 400 is 1.6 mm and the adhesive frame 400 is located in the middle of the border region. One side (such as the left side) of the adhesive frame 400 is 0.2 mm away from one side (such as the left edge) of the border region, and the other side of the adhesive frame (such as the right side) is 0.2 mm away from the other side (such as the right side) of the border region.

Optionally, in the touch display module provided in some embodiments of the present disclosure, the adhesive frame 400 is disposed between the force sensing resistor layer 200 and the touch panel 300, and the orthographic projection of the adhesive frame 400 on the touch panel 300 is at least partially located in the touch region 320, that is, the orthographic projection of the adhesive frame 400 on the touch panel 300 and the touch region 320 have an overlapping region. In this case, the adhesive frame 400 is a conductive adhesive frame. When a conductive adhesive is used as a component material of the adhesive frame 400, the adhesive frame 400 may have both a connection function and a conductive function, and realize the electrical contact between the force sensing resistor layer 200 and the touch region of the touch panel 300, thereby breaking the restrictions in which the touch panel 300 has a touch region and a non-touch region. The adhesive frame 400 may be directly set on the touch region 320 so as to reduce the non-touch region or even removing the non-touch region (i.e., the border region). Thereby, the area of the touch region of the touch panel 300 may be made larger, and even the touch panel 300 may only include the touch region without setting the border region. As a result, when the force sensing resistor layer 200 and the touch panel 300 have the same area, a larger effective touch region may be obtained, it may realize the borderless design of the touch panel 300 and also realize a narrow-border touch display module, and even a borderless touch display module.

For a common touch panel 300 with a border region, a conductive adhesive frame 400 can also be used. The conductive adhesive frame 400 may be coated in the border region 330 or the touch region 320, and may be partly coated in the border region 330 and partly coated in touch region 320, that is, it covers the border of the border region and the touch region. At least a part of the orthographic projection of the adhesive frame on the touch panel is located in the touch region. It may be seen that when a conductive plastic frame is used, the adhesive coating process may be selected from a wide range, which reduces the difficulty of process.

Figure 4:
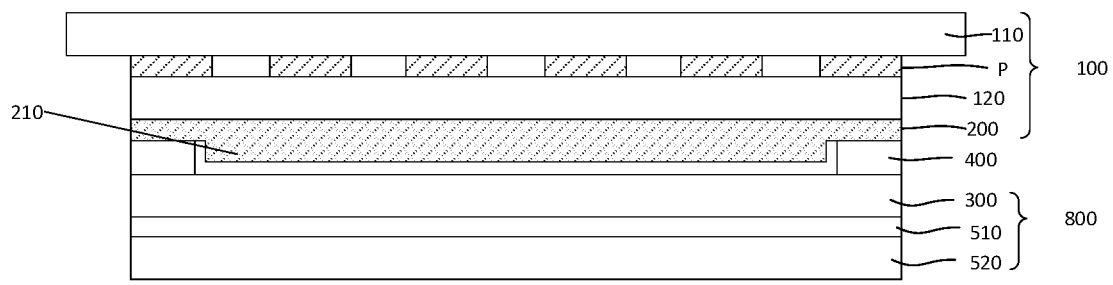
FIG. 4 is a schematic structural view of a touch display module provided by some embodiments of the present disclosure.

FIG. 4 is a schematic structural view of a touch display module according to some embodiments of the present disclosure. In some embodiments, as shown in FIG. 4, a touch display module is provided in some embodiments of the present disclosure. The force sensing resistor layer 200 is provided with a protruding portion 210. An orthographic projection of the protruding portion 210 on the touch panel 300 is located within the touch region 320 of the touch panel 300 or coincides with the touch region 320 of the touch panel 300, that is, an area of the orthographic projection of the protruding portion 210 on the touch panel 300 is smaller than or equal to the area of the touch region 320. The orthographic projection of the adhesive frame 400 on the touch panel 300 does not overlap with the orthographic projection of the protruding portion 210 on the touch panel 300, and the adhesive frame 400 surrounds the protruding portion 210 of the force sensing resistor layer 200. In this case, the force sensing resistor layer 200 has a stepped structure with two thicknesses. A first portion of the force sensing resistor layer 200 which is opposite to the touch region 320 of the touch panel 300 and includes the protruding portion 210 is thicker so as to be closer to the touch region 320 of the touch panel 300 to improve the sensing sensitivity, and a second portion of the force sensing resistor layer 200 which surrounds the first portion and is opposite to the frame region 320 of the touch panel 300 is thinner. The adhesive frame 400 is provided between the second portion of the force sensing resistor layer 200 and the peripheral region of the touch panel 300, such as the border region 330, to ensure that the adhesive frame 400 has a large thickness, so that the force sensing resistor layer 200 and the touch panel 300 may be more firmly bonded, the maximum allowable thickness of the adhesive frame 400 is increased, and the bending reliability of the touch display module is improved.

Similarly, in the above-mentioned touch display module whose force sensing resistor layer is provided with a protruding portion, the adhesive frame 400 is also disposed between the force sensing resistor layer 200 and the touch panel 300, and the orthographic projection of the adhesive frame 400 on the touch panel 300 is at least partially located in the touch region 320. In this case, the adhesive frame 400 may be a conductive adhesive frame.

As shown in FIG. 1 and FIG. 2, in the touch display module provided by the foregoing embodiments of the present disclosure, the adhesive frame 400 is disposed between the force sensing resistor layer 200 and the touch panel 300. In this case, the force sensing resistor layer 200 and the touch panel 300 are separated by the adhesive frame 400, and a thickness of a gap between the force sensing resistor layer 200 and the touch region 320 of the touch panel 300 is equal to a thickness of the adhesive frame 400. Compared with the conventional touch display module, the touch display module provided in the embodiments has the advantages of improving touch sensitivity and effectively improving the bending property of the display module, and has a small structure change and a simple structure. The touch display module provided in the embodiments may be produced by relying on most of the existing production equipments for producing the existing touch display module, there is no need to significantly update the production equipments and greatly change the structural design of the touch display module, thereby saving production cost.

In addition, as shown in FIG. 3, the touch panel assembly 800 of the touch display module further includes a base layer 520 and an adhesive layer 510. The base layer 520, such as a flexible steel sheet layer (SUS) 520, supports the touch panel 300. The adhesive layer 510, such as a pressure-sensitive adhesive layer (PSA) 510, is used to bond the touch panel 300 and the base layer 520. The pressure-sensitive adhesive layer 510 is disposed on a side of the touch panel 300 away from the force sensing resistor layer 200, and the flexible steel sheet layer 520 is disposed on a side of the pressure-sensitive adhesive layer 510 away from the touch panel 300 to improve the structural strength of the touch display module.

Figure 5:
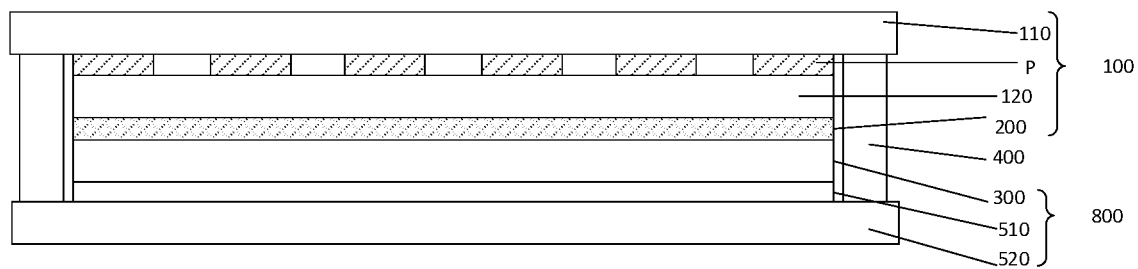
FIG. 5 is a schematic structural view of a touch display module provided by some embodiments of the present disclosure.
Figure 6:
FIG. 6 is a schematic plan view of an adhesive frame provided in some embodiments of the present disclosure.

FIG. 5 is a schematic structural view of a touch display module provided by some embodiments of the present disclosure, and FIG. 6 is a schematic plan structural view of an adhesive frame provided by some embodiments of the present disclosure. In some embodiments, as shown in FIGS. 5 and 6, the OLED display panel assembly 100 includes a back plate 120 and display units P, such as OLED elements, arranged in an array on the back plate 120. The back plate 120 and the display units P thereon constitute an OLED display panel. The OLED display panel assembly 100 further includes a cover plate 110 covering the OLED display panel. The cover plate 110 is disposed on a side of the display unit P away from the back plate 120 to protect the OLED display panel. A force sensing resistor layer 200 is located on a side of the back plate 120 away from the display units P. The touch panel assembly 800 includes a base layer 520, a touch panel 300 disposed on the base layer 520, and an adhesive layer 510 located between the base layer 520 and the touch panel 300. The force sensing resistor layer 200 and the touch panel 300 face each other. The size (e.g., area) of the cover plate 110 is larger than the size (e.g., area) of the back plate 120, that is, an orthographic projection of the back plate 120 on the cover plate 110 falls within the cover plate 110 and is located at a middle region of the cover plate 110. The size (e.g., area) of the base layer 520 is larger than the size (e.g., area) of the touch panel 300, that is, an orthographic projection of the touch panel 300 on the base layer 520 falls within the base layer 520 and is located at a middle region of the base layer 520. The adhesive frame 400 is adhered between the cover plate 110 and the base layer 520. Specifically, the adhesive frame 400 adheres a peripheral region of the cover plate 110 to a peripheral region of the base layer 520. The back plate 120, the force sensing resistor layer 200, and the touch panel 300 are surrounded by the adhesive frame 400. In addition, the adhesive frame 400 is not a closed frame, and is provided with a cable outlet. The cable outlet is used to allow the wires connecting the touch panel and the external control circuit to pass through. In this case, in the touch display module, the adhesive frame 400 surrounds a laminated structure formed by the back plate 120, the force sensing resistor layer 200, and the touch panel 300. The force sensing resistor layer 200 and the touch panel 300 may be in direct contact, as a result, the touch sensitivity is high. The thickness of the adhesive frame 400 may be further increased, and it will not be affected by the sensing sensitivity and the depth of the screen's touch recognition. The adhesion of the touch display module is stronger, which is conducive to improving the overall mechanical performance of the touch display module.

Figure 7:
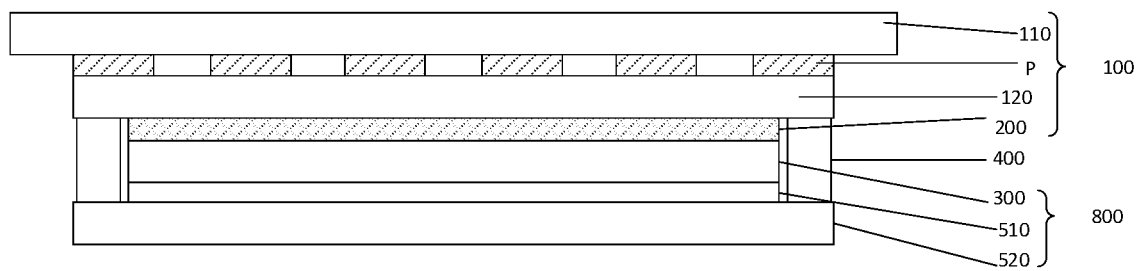
FIG. 7 is a schematic structural view of a touch display module provided by some embodiments of the present disclosure.

FIG. 7 is a schematic structural view of a touch display module provided by some embodiments of the present disclosure. In some feasible embodiments, as shown in FIG. 7, the OLED display panel assembly 100 includes a back plate 120 and display units P, such as OLED elements, arranged in an array on the back plate 120. The back plate 120 and the display units P thereon constitute an OLED display panel. The OLED display panel assembly 100 further includes a cover plate 110 covering the OLED display panel. The cover plate 110 is disposed on a side of the display units P away from the back plate 120 to protect the OLED display panel. The force sensing resistor layer 200 is located on a side of the back plate 120 away from the display units P. The touch panel assembly 800 includes a base layer 520, a touch panel 300 disposed on the base layer 520, and an adhesive layer 510 located between the base layer 520 and the touch panel 300. The force sensing resistor layer 200 and the touch panel 300 face each other. The size (e.g., area) of the cover plate 110 is larger than the size (e.g., area) of the back plate 120, that is, an orthographic projection of the back plate 120 on the cover plate 110 falls within the cover plate 110 and is located at a middle region of the cover plate 110. The size (e.g., area) of the back plate 120 is larger than the size (e.g., area) of the force sensing resistor layer 200, that is, an orthographic projection of the force sensing resistor layer 200 on the back plate 120 falls within the back plate 120 and is located at a middle region of the back plate 120. The size (e.g., area) of the base layer 520 is larger than the size (e.g., area) of the touch panel 300, that is, an orthographic projection of the touch panel 300 on the base layer 520 falls within the base layer 520 and is located at a middle region of the base layer 520. The adhesive frame 400 is adhered between the back plate 120 and the base layer 520. Specifically, the adhesive frame 400 adheres a peripheral region of the back plate 120 to a peripheral region of the base layer 520. The force sensing resistor layer 200 and the touch panel 300 are surrounded by the adhesive frame 400, and the adhesive frame 400 is not a closed frame, and is provided with a cable outlet. The cable outlet is used to allow the wires connecting the touch panel and the external control circuit to pass through. In this case, compared with the above embodiments, in the embodiments, the force sensing resistor layer 200 and the touch panel 300 are retracted synchronously, and are in free contact. The adhesive frame 400 is provided in the peripheral regions (i.e., the surrounding edges) of the back plate 120 and the base layer 520. The adhesive frame 400 is adaptively designed according to the position of the lead-out wires of the touch panel 300. In this solution, the touch panel 300 can also adopt a borderless design, the entire touch display module has a smaller frame, and has the advantage that thickness design of the adhesive frame 400 is not limited.

Some embodiments of the present disclosure further include a touch display device including the touch display module in the foregoing embodiments, a middle frame, and an outer adhesive frame. The middle frame includes a bottom portion and a side portion, and the side portion extends from an edge of the bottom portion in a direction perpendicular to the bottom portion, and the bottom portion and the side portion surround an accommodating space, and the accommodating space accommodates the touch panel assembly. The outer adhesive frame is disposed between the cover plate and the side portion and configured to adhere the cover plate to the side portion.

The following takes a touch display device including the touch display module in FIG. 7 as an example for description.

Figure 8:
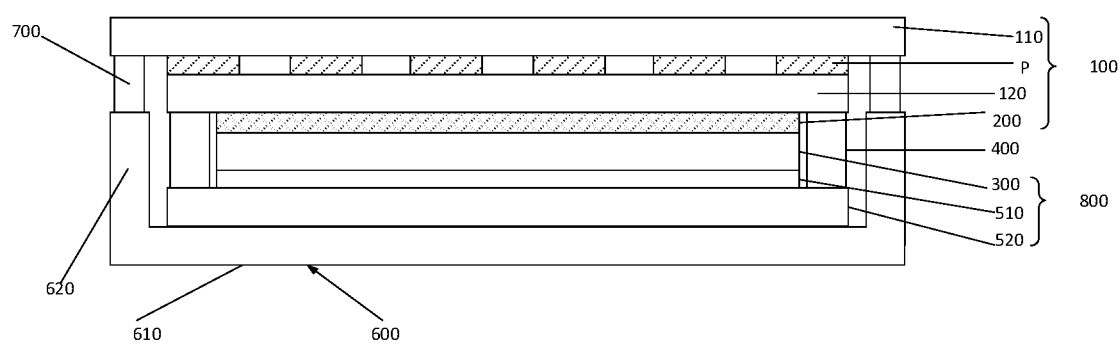
FIG. 8 is a schematic structural view of a touch display device provided by some embodiments of the present disclosure.
Figure 9:
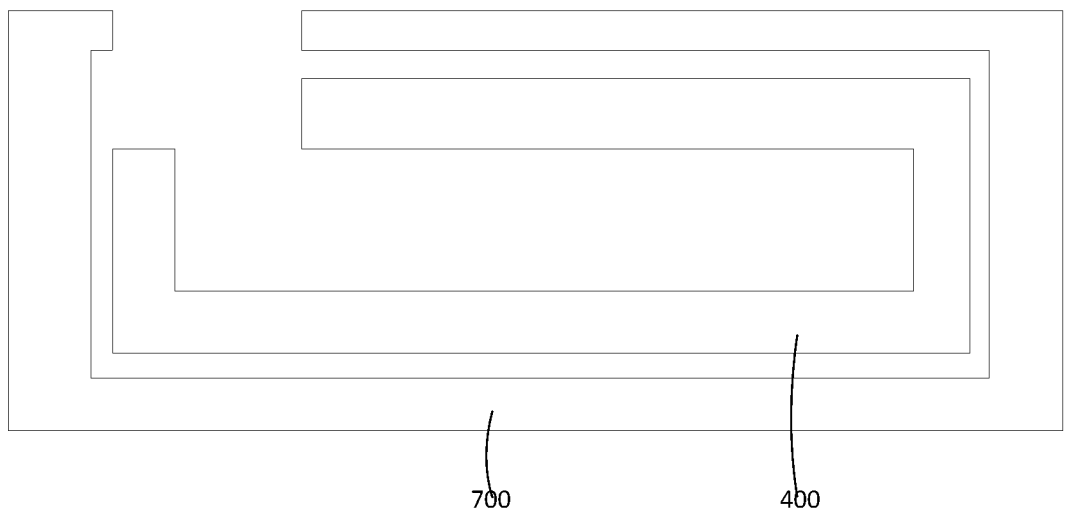
FIG. 9 is a schematic plan view of an adhesive frame and an outer adhesive frame of the touch display device in FIG. 8.

FIG. 8 is a schematic structural view of a touch display device provided by some embodiments of the present disclosure. FIG. 9 is a schematic plan structural view of an adhesive frame and an outer adhesive frame of the touch display device in FIG. 8. As shown in FIGS. 8 and 9, the touch display module includes the touch display module shown in FIG. 7, and further includes a middle frame 600 and an outer adhesive frame 700. The middle frame 600 includes a bottom portion 610 and a side portion 620. The side portion 620 extends from an edge of the bottom portion 610 in a direction perpendicular to the bottom portion 610, and the bottom portion 610 and the side portion 620 surround an accommodating space. The touch panel assembly 800 is located in the accommodating space. Specifically, the touch panel 300, the adhesive layer 510, and the base layer 520 are located in the accommodating space. In some embodiments, the back plate 120, the force sensing resistor layer 200, and the adhesive frame 400 may also be located in the accommodating space of the middle frame 600. The outer adhesive frame 700 is adhered between the side portion of the middle frame 600 and the cover plate 110. The outer adhesive frame 700 is not a closed frame, and is provided with a cable outlet. The cable outlet is used to allow the wires connecting the touch panel and the external control circuit to pass through. The cable outlet of the outer adhesive frame 700 corresponds to the cable outlet of the adhesive frame 400. The touch display device having the middle frame 600 and the outer adhesive frame 700 is not limited to including the touch display module shown in FIG. 7, but is also suitable for including various touch display modules described above. In the state of the whole machine, the outer adhesive frame 700 is disposed between the periphery of the cover plate 110 and the periphery of the middle frame 600. The entire structure adopts a double-layer adhesive frame design, which may greatly increase the strength of the touch display device and reduce the risk of the touch display module of the touch display device from cracking when it is bent.

Figure 10:
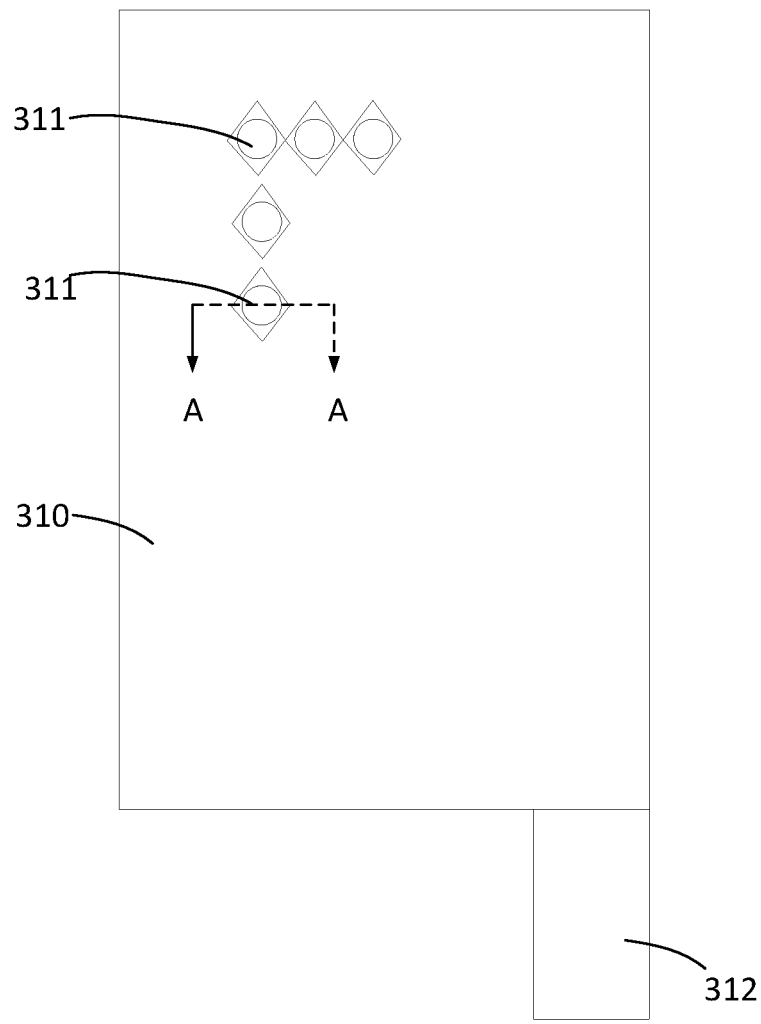
FIG. 10 is a schematic plan view of a touch panel provided by some embodiments of the present disclosure.
Figure 11:
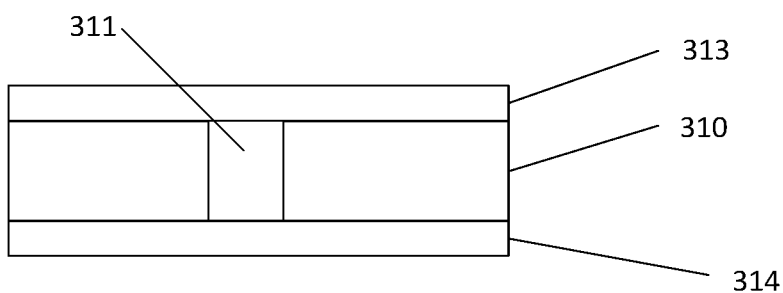
FIG. 11 is a sectional view taken along line A-A in FIG. 10.

FIG. 10 is a schematic plan view of a touch panel provided by some embodiments of the present disclosure. FIG. 11 is a cross-sectional view taken along line AA in FIG. 10. As shown in FIGS. 10 and 11, the touch panel includes a substrate 310, a touch electrode layer 313 on one side of the substrate 310, and a lead wire layer 314 on the other side of the substrate 310. The substrate 310 is provided with a plurality of lead holes 311 penetrating the substrate 310. The material of the substrate 310 may be polyimide (abbreviated as PI). Lead wires in the lead wire layer 314 may be electrically connected to the touch electrode layer 313 through the lead holes 311. By means of the lead holes 311 provided on the substrate 310, touch signals generated by the touch electrode layer 313 provided on a front surface of the substrate 310 is led out from a back of the substrate 310 and transmitted to the flexible circuit board 312 through the lead wires, so that the borderless design of the touch panel 300 may be realized.

Specifically, the position of the lead-out wires of the touch panel 300 can be adjusted according to the structure design and the result of the bending simulation. Of course, for the touch panel 300 with a border design, touch signals generated by the touch electrode layer 313 provided on the front surface of the base substrate 310 may be led out by providing lead wires in the border region, or lead wires may be provided on the back surface of the base substrate 310, so that signals generated by the touch electrode layer 313 provided on the front surface of the base substrate 310 is led out from the back surface of the base substrate 310 through the lead holes 311.

Based on the same inventive concept, some embodiments of the present disclosure provide a display device including the touch display module described in detail above. By providing an adhesive frame with an adhesive function between the OLED display panel assembly and the touch panel assembly, the force sensing resistor layer and the touch region of the touch panel can be directly attached or there is a certain gap, so that the touch sensitivity of the resistive touch display is improved. By using an adhesive frame connection manner instead of the original connection manner using the an adhesive layer, the bending property of the display module may be effectively improved. Therefore, the display including the touch display module provided by the present disclosure suitable for being in a bendable form.

Based on the same inventive concept, some embodiments of the present disclosure further provide an electronic device including the display device described above. The display device includes the touch display module provided by the embodiments of the present disclosure to make it easier to assemble into a foldable electronic device. Although a resistive screen is used, the touch sensitivity is greatly improved compared to the resistive screen in the prior art.

Those skilled in the art may understand that steps, measures, and solutions in various operations, methods and processes that have been discussed in the present disclosure may be alternated, changed, combined, or deleted. Further, other steps, measures, and solutions in various operations, methods and processes that have been discussed in the present disclosure may also be alternated, modified, rearranged, decomposed, combined, or deleted. Further, steps, measures, and solutions, in the prior art, related to various operations, methods, and processes disclosed in the present disclosure various operations, methods, and processes disclosed in this disclosure may also be alternated, modified, rearranged, decomposed, combined, or deleted.

In the description of the present disclosure, it needs to be understood that the orientations or positional relationships indicated by the terms "center/middle", "up", "down", "front", "rear", "left", "right", "vertical", "horizontal", "top", "bottom", "inside", "outer", etc. are based on the orientations or positional relationships shown in the drawings, and are merely for the convenience of describing the present disclosure and simplifying the description, and are not intended to indicate or imply that devices or elements referred to must have a specific orientation, be constructed and operate in a specific orientation. Therefore they may not be considered as limitations on the present disclosure.

The terms "first" and "second" are used for descriptive purposes only, and may not be interpreted as indicating or implying relative importance or implicitly indicating the number of technical features indicated. Therefore, the features defined by "first" and/or "second" may explicitly or implicitly include one or more of the features. In the description of the present disclosure, unless otherwise stated, "plurality" means two or more.

In the description of the specification, specific features, structures, materials, or characteristics may be combined in a suitable manner in any one or more embodiments or examples.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A touch display module comprising:
    a display panel assembly;
    a touch panel assembly opposite to the display panel assembly; and
    an adhesive frame disposed between the display panel assembly and the touch panel assembly,
    wherein the display panel assembly comprises a force sensing resistor layer on a side of the display panel assembly facing the touch panel assembly,
    wherein the adhesive frame is configured to adhere a peripheral region of the display panel assembly to a peripheral region of the touch panel assembly, and
    wherein the display panel assembly further comprises:
        a back plate;
        a plurality of display units arranged in an array on the back plate; and
        a cover plate on a side of the plurality of display units away from the back plate,
        wherein the force sensing resistor layer is disposed on a side of the back plate away from the cover plate, the touch panel assembly comprises a touch panel, and the force sensing resistor layer and the touch panel face each other.

2. The touch display module according to claim 1, wherein the adhesive frame is disposed between the force sensing resistor layer and the touch panel, and the adhesive frame is configured to adhere the force sensing resistor layer to the touch panel.

3. The touch display module according to claim 2, wherein the touch panel comprises a touch region and a border region surrounding the touch region, and an orthographic projection of the adhesive frame on the touch panel falls within the border region.

4. The touch display module according to claim 3, wherein the force sensing resistor layer comprises a protruding portion facing the touch panel, and an orthographic projection of the protruding portion on the touch panel falls within the touch region or coincides with the touch region.

5. The touch display module according to claim 2, wherein the touch panel comprises a touch region, an orthographic projection of the adhesive frame on the touch panel at least partially overlaps with the touch region, and the adhesive frame is a conductive adhesive frame.

6. The touch display module according to claim 1, wherein the force sensing resistor layer comprises a protruding portion facing the touch panel, the protruding portion is surrounded by the adhesive frame, and an orthographic projection of the protruding portion on the touch panel does not overlap with an orthographic projection of the adhesive frame on the touch panel.

7. The touch display module according to claim 1, wherein the adhesive frame is a closed frame.

8. The touch display module according to claim 1, wherein the touch panel assembly further comprises:
    a base layer configured to support the touch panel; and
    an adhesive layer disposed between the base layer and the touch panel and configured to adhere the base layer with the touch panel,
    wherein the base layer is located on a side of the touch panel away from the force sensing resistor layer.

9. The touch display module according to claim 8, wherein the adhesive frame is disposed between the cover plate and the base layer, and is configured to adhere the cover plate to the base layer, and the adhesive frame surrounds the back plate, the force sensing resistor layer, and the touch panel which are stacked on each other.

10. The touch display module according to claim 9, wherein the adhesive frame is not a closed frame and comprises a cable outlet.

11. The touch display module according to claim 8, wherein the adhesive frame is disposed between the back plate and the base layer and is configured to adhere the back plate to the base layer, and the adhesive frame surrounds the force sensing resistor layer and the touch panel which are stacked on each other.

12. The touch display module according to claim 11, wherein the adhesive frame is not a closed frame and comprises a cable outlet.

13. The touch display module according to claim 1, wherein the touch panel comprises:
    a substrate;
    a touch electrode layer disposed on one side of the substrate and facing the force sensing resistor layer; and
    a lead wire layer disposed on the other side of the substrate opposite to the one side,
    wherein the substrate is provided with a lead hole so that a lead wire in the lead wire layer is electrically connected to the touch electrode layer through the lead hole.

14. The touch display module according to claim 13, wherein the touch panel comprises a touch region, and the touch region covers the entire substrate.

15. The touch display module according to claim 1, wherein the display panel is an OLED display panel, and each display unit is an OLED element.

16. The touch display module according to claim 8, wherein the base layer is a flexible steel sheet layer, and the adhesive layer is a pressure-sensitive adhesive layer.

17. A touch display device, comprising:
- the touch display module according to claim 1;
- a middle frame comprising a bottom portion and a side portion, wherein the side portion extends from an edge of the bottom portion in a direction perpendicular to the bottom portion, and the bottom portion and the side portion surround an accommodating space which accommodates the touch panel assembly; and
- an outer adhesive frame disposed between the cover plate and the side portion, and configured to adhere the cover plate to the side portion.

18. The touch display device according to claim 17, wherein the outer adhesive frame is not a closed frame and comprises a cable outlet.

19. An electronic device comprising the touch display device according to claim 17.

* * * * *